(Model.)
W. H. WIGMORE.
COMBINED GAS, AIR, AND STEAM ROTARY ENGINE.
No. 249,214.  Patented Nov. 8, 1881.
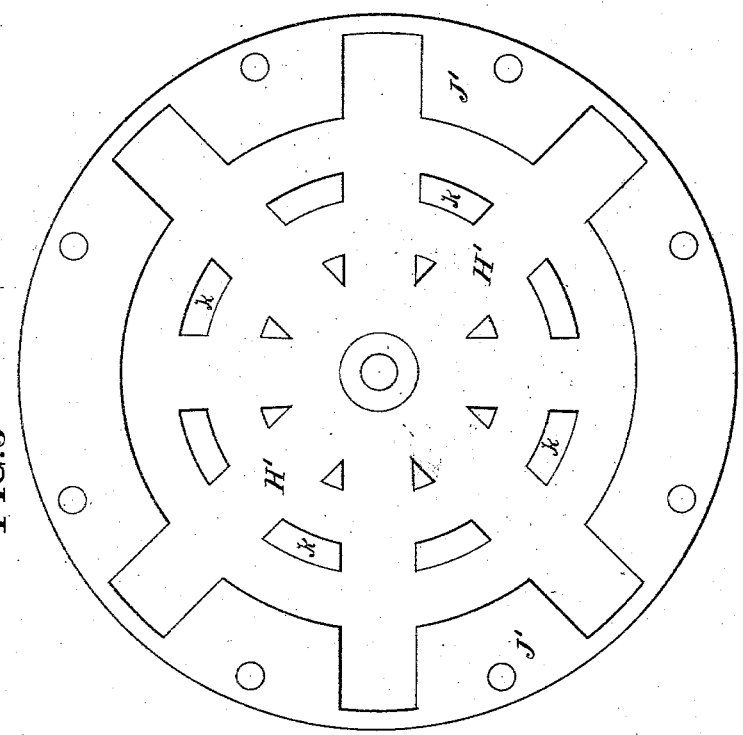
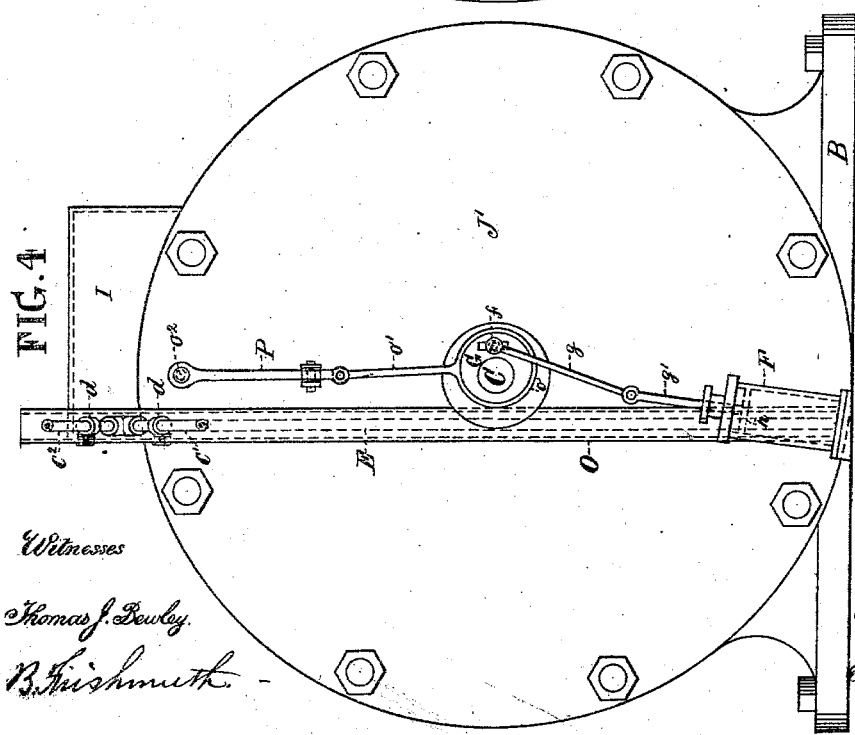
Witnesses
Thomas J. Bewley.
B. Frishmuth.
Inventor
William H. Wigmore.
Stephen Ustick
atty.

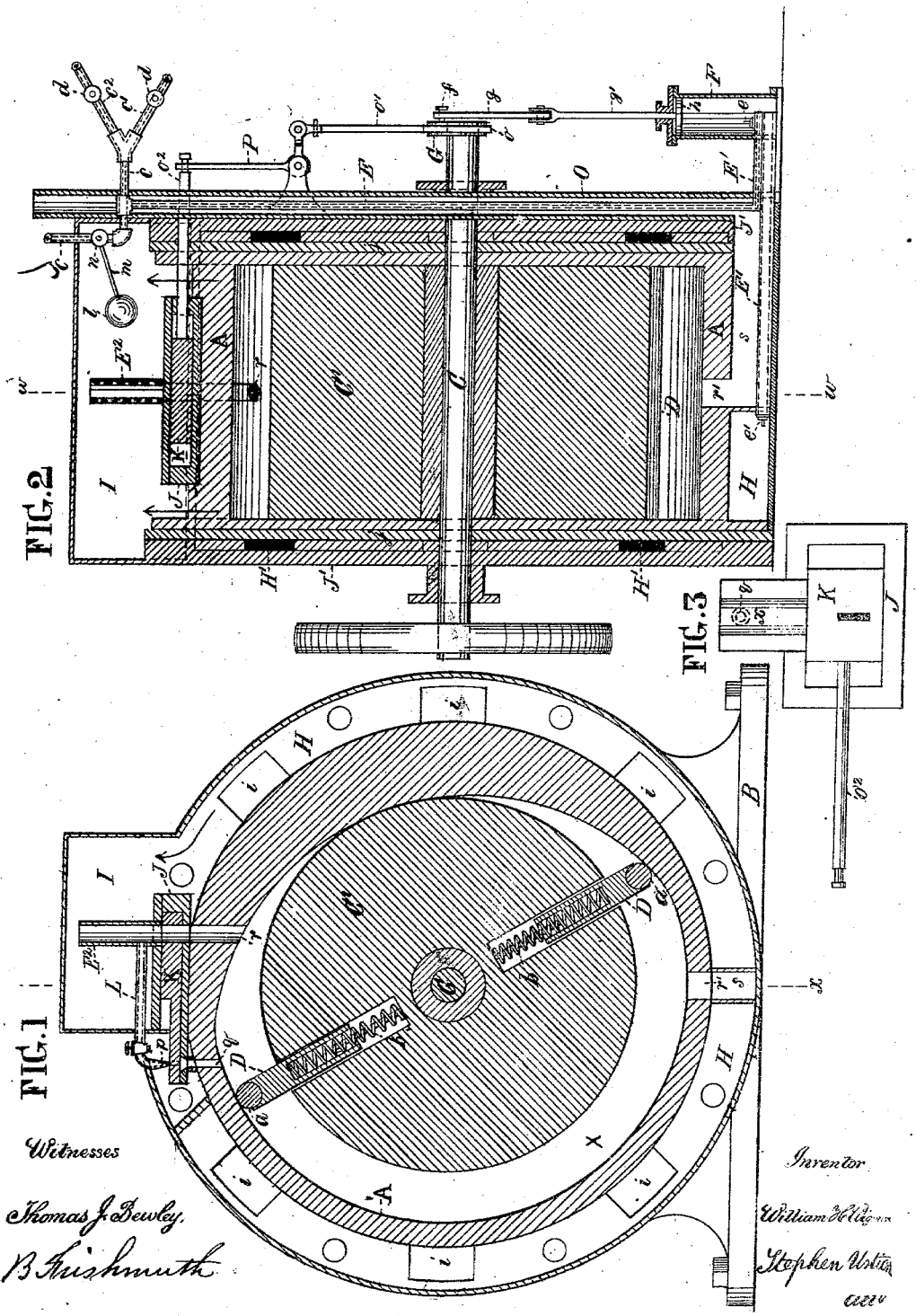

UNITED STATES PATENT OFFICE.

WILLIAM H. WIGMORE, OF PHILADELPHIA, PENNSYLVANIA.

COMBINED GAS, AIR, AND STEAM ROTARY ENGINE.

SPECIFICATION forming part of Letters Patent No. 249,214, dated November 8, 1881.

Application filed April 23, 1881. (Model.)

*To all whom it may concern:*

Be it known that I, WILLIAM H. WIGMORE, a citizen of the United States, residing at Philadelphia, in the county of Philadelphia and State of Pennsylvania, have invented a new and useful Improvement in Combined Gas, Air, and Steam Rotary Engine, of which the following is a specification.

The nature of my invention mainly consists in the introduction of gas, air, and water simultaneously and together into a tank connected with a cylinder of a steam-engine, a portion of the water being used in forming a jacket around the greater portion of the circumference of the cylinder, and also to the ends thereof, and in the latter case acting as cushions to react against concussions, as hereinafter described. Another portion of the water is utilized in generating steam, which is combined with the air and gas in their heated state for operating the engine. The means for introducing the gas, air, and water into the engine and regulating the same, and also for heating them as they are passed into the cylinder, are hereinafter fully described.

In the accompanying drawings, which make a part of this specification, Figure 1 is a vertical section through the broken line $w\ w$ of Fig. 2. Fig. 2 is a central vertical section at the broken line $x\ x$ of Fig. 1, and an elevation of the pipes E and O, the latter being in section, the said pipes being out of lines with said central plane, as represented in Fig. 4. Fig. 3 is a top view of the valve-chest J and valve K, the cap-plate of the chest being removed. Fig. 4, Sheet No. 2, is a rear elevation of the engine. Fig. 5 is an inside view of one of the plates $j'$.

Like letters of reference in all the figures indicate the same parts.

A represents the cylinder of my improved engine, and B the bed-plate.

C is the driving-shaft, which is provided with drum C', having pistons D D, the pistons having friction-rollers $a\ a$ at their outer ends and springs $b\ b$ at their inner ends, which serve to keep the rollers in contact with the surface of the cylinder. As the combination of the rollers and springs with the piston is fully described in a previous application of mine, a detailed description is omitted here.

E is a vertical pipe for supplying air, gas, and water to the engine simultaneously and all together, the water passing into its upper end through the pipe $c$, as shown in Fig. 2, and the air in either of the branch pipes $c'\ c^2$ of said pipe $c$, and the gas through the other branch pipes. Each of the pipes $c\ c'\ c^2$ is provided with a stop-cock, $d$, for opening and closing it and regulating the supply of water, air, or gas, as the case may be. The lower end of the supply-pipe E has a horizontal extension, as shown in Fig. 2, which is connected with the pump F. It is provided with a check-valve, $e$. One end of the driving-shaft C is provided with an eccentric, G, for operating a slide-valve, hereinafter described. The eccentric is provided with a crank-pin, $f$, with which one end of the rod $g$ is connected, the other end being jointed to the rod $g'$ of the piston $h$ of the pump F, whereby water, air, and gas are drawn through the pipe E into the pump at each upward stroke of the piston $h$, and at its downward stroke the water is forced through the horizontal pipe E' (provided with a check-valve, $e'$) into the lower part of the chamber H, which surrounds the shell of the cylinder A, with the exception of the part occupied by the tank I, hereinafter described, and a small space which contains the nozzle $p$ of the pipe L, and the projecting plate of the valve K, as seen in Fig. 1. This chamber has communication with the chambers H' H' at the ends of the cylinder by means of the openings $i$ in the cap-plates $j\ j$. The chambers are formed in the inner face of the thick plates $j'\ j'$, which, with the plates $j\ j$, are bolted fast to the flanges of the cylinder A. One of the plates $j'$ is shown in detail in Fig. 5. Throughout the area of each chamber H' there are lugs $k$, which are level with the inner face of the plate, for the purpose of giving an unyielding support to the contiguous thin plate $j$, so as to resist the internal pressure or shocks occurring during the running of the engine.

I is a tank, located on the upper side of the cylinder A, into which the water, air, and gas are caused to ascend by the force of the pump F. It has an open communication with the circumferential chamber or jacket H, as seen in Fig. 1. The air and gas, being lighter than the water, float thereon and fill the upper part of the tank. The tank is provided with a float, $l$, having a rod, $m$, which has a ball-valve, $n$, at its extreme end, which is connected with the pipe $c$, for cutting off the supply of water through the pipe when the water in the tank has reached the maximum height, whereby to maintain at all times sufficient space in the upper part of the tank for the accumulation of the steam that is generated by the heating of the water in the jackets H H' H' and the tank.

J is a valve-chest, provided with a valve, K, for opening and closing the communication between the vertical pipe E² and the cylinder A for the passage of the air, gas, and steam which may be generated from the upper part of the tank I, and cutting off the supply at the proper times, the valve being operated by means of the eccentric G, above described, the eccentric having a strap, o, and rod o', which is jointed to the bell-crank lever P, the latter being jointed to the rod o² of the valve, as seen in Fig. 2. The valve is shown in detail in Fig. 3 in connection with the chest J, the cap-plate being removed. L is a horizontal pipe, which communicates at one end with the pipe E², to draw off a portion of the gas, which is ignited at its outer end, which has a nozzle, p, that nearly touches the valve K, which has a projection, x, for opening and closing the communication with the opening q of the cylinder A at the time the valve closes the communication between the pipe E² and the cylinder, whereby a jet of flame is forced into the cylinder and ignites the gas and air, thus giving an increased expansive force thereto at each stroke of the valve, both forward and backward. The part x of the valve is rounded, as represented, to admit of direct projection of the flame of the nozzle of the pipe L through the passage q of the cylinder as said projection passes from under the nozzle.

The operation of the various parts is as follows: The engine, after being put in motion and supplied with air, gas, and water, and has become sufficiently heated to dispense with the use of air, may be used without the supply of air. Then, at pleasure, the air-pipe c' or c², as the case may be, (as either may be used for air,) may be closed by turning the stop-cock d so as to only use the other branch pipe which supplies the gas, in combination with the water-supply pipe c. The valve K is so set as to open the communication between the inlet-port r of the cylinder A, and the pipe E at the end of each forward and backward stroke of either piston D has passed the port, and to close the communication when the piston has reached the point X of the cylinder A, so as to cause the combined gas, air, and steam to act expansively until the piston has reached the exhaust-port r'. They are then exhausted through said port, the channel s, and the exhaust-pipe O, which surrounds the feed-pipe E, which receives a considerable amount of heat from the exhaust, which is thus utilized in heating the gas, air, and water before they enter the annular jacket H of the cylinder A. Each jet of flame injected into the cylinder A from the nozzle p of the pipe L ignites the gas and air it comes in contact with, whereby their expansive force is increased for the propulsion of the engine, and as the water in the jackets H H' H' is heated also thereby, it rises into the tank I, and steam is generated in the space above the water and descends through the pipe E' into the cylinder A at each opening of the port r, and combines with the gas and air in propelling the engine. Each injection of a flame into the cylinder by suddenly striking the gas and air produces a concussion, and the numerous repeated concussions thus produced, unless counteracted, are calculated to produce violent jars to the engine, which would much decrease its speed and greatly derange it. I therefore make the chambers H' H' at the ends of the cylinder of sufficient capacity to form efficient cushions to react against the concussions, and thereby tend to produce an easy running of the engine, in addition to the use of said chambers as jackets for the ends of the cylinder A.

I claim as my invention—

1. The introduction of water, air, and gas simultaneously and together into an engine, whereby the expansive force of the steam generated from the water in its passage to the chamber of the cylinder is combined with the expansive force of the air and gas, substantially as described.

2. The pipe E, in combination with the pipes c, c', and c², or their equivalents, at its upper end, in combination with the pump F at its lower end, for supplying an engine with water, air, and gas simultaneously and together, substantially as described.

3. The combination of the pump F, pipes E and E', and annular chamber H with the tank I, substantially as and for the purpose set forth.

4. The combination of the chambers H' H' with the chamber H, whereby the former, in addition to their function as jackets for decreasing the escape of heat through the ends of the cylinder A, perform the function of cushions to react against the concussions in the cylinder, substantially as described.

5. The combination of the pipe E² and valve K with the tank I and cylinder A, for opening and closing the communication between the tank and cylinder, the valve being operated by means of the eccentric G or its equivalent, substantially as described.

6. The pipe L, in combination with the pipe E' and valve K, for opening and closing the passage q, to provide for jets of flame from the nozzle of the said pipe L into the cylinder A, substantially as and for the purpose set forth.

7. The valve K, in combination with the pipe L, said valve having a projection, x, of rounded form on its upper edge, to prevent cutting or disturbing the flame from the nozzle of the pipe L in its passage under the same, substantially as described.

WILLIAM H. WIGMORE.

Witnesses:
THOMAS J. BEWLEY,
STEPHEN USTICK.